(12) United States Patent
Shimada

(10) Patent No.: US 10,996,454 B2
(45) Date of Patent: May 4, 2021

(54) MICROSCOPE

(71) Applicant: OLYMPUS CORPORATION, Hachioji (JP)

(72) Inventor: Yoshihiro Shimada, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 69 days.

(21) Appl. No.: 16/370,630

(22) Filed: Mar. 29, 2019

(65) Prior Publication Data

US 2019/0310454 A1 Oct. 10, 2019

(30) Foreign Application Priority Data

Apr. 4, 2018 (JP) .............................. JP2018-072067

(51) Int. Cl.
| | | |
|---|---|---|
| *H04N 5/247* | (2006.01) | |
| *G02B 21/36* | (2006.01) | |
| *G06T 7/70* | (2017.01) | |
| *G02B 21/00* | (2006.01) | |
| *G02B 21/02* | (2006.01) | |

(Continued)

(52) U.S. Cl.
CPC ....... *G02B 21/365* (2013.01); *G02B 21/0048* (2013.01); *G02B 21/02* (2013.01); *G02B 21/088* (2013.01); *G02B 21/26* (2013.01); *G06T 7/60* (2013.01); *G06T 7/70* (2017.01); *H04N 5/247* (2013.01); *G06T 2207/10056* (2013.01)

(58) Field of Classification Search
None
See application file for complete search history.

(56) References Cited

U.S. PATENT DOCUMENTS

| | | |
|---|---|---|
| 5,989,835 A | 11/1999 | Dunlay et al. |
| 6,103,479 A | 8/2000 | Taylor |

(Continued)

FOREIGN PATENT DOCUMENTS

| | | |
|---|---|---|
| JP | 2000509827 A | 8/2000 |
| JP | 2009198709 A | 9/2009 |

(Continued)

OTHER PUBLICATIONS

Extended European Search Report (EESR) dated Sep. 3, 2019 issued in European Application No. 19163181.1.

*Primary Examiner* — Mikhail Itskovich
(74) *Attorney, Agent, or Firm* — Holtz, Holtz & Volek PC

(57) ABSTRACT

A microscope includes a movable stage supporting wells arranged in an array, a first imaging unit having a low-magnification objective lens, a second imaging unit having a high-magnification objective lens, a computer determining a representative position of a spheroid based on imaging data of the spheroid acquired by the first imaging unit, and a controller causing respective imaging units to sequentially acquire imaging data of the spheroid in each of the wells. The controller causes the first imaging unit to acquire imaging data for the spheroid in one of the wells, and then causes the stage to adjust the representative position to the optical axis of the high-magnification objective lens, and further causes the second imaging unit to acquire imaging data while causing the first imaging unit to acquire imaging data of the spheroid in another of the wells in synchronization with acquisition by the second imaging unit.

19 Claims, 9 Drawing Sheets

(51) Int. Cl.
*G02B 21/08* (2006.01)
*G02B 21/26* (2006.01)
*G06T 7/60* (2017.01)

(56) References Cited

U.S. PATENT DOCUMENTS

| | | | |
|---|---|---|---|
| 7,170,597 B1 * | 1/2007 | Hooper | G01N 21/6458 |
| | | | 356/317 |
| 7,522,757 B2 * | 4/2009 | Tsipouras | G01N 1/312 |
| | | | 382/128 |
| 2003/0030896 A1 | 2/2003 | Brooker | |
| 2006/0039593 A1 * | 2/2006 | Sammak | G06K 9/00127 |
| | | | 382/133 |
| 2016/0363748 A1 | 12/2016 | Kitagawa et al. | |
| 2017/0017070 A1 | 1/2017 | Suzuki | |
| 2017/0276924 A1 | 9/2017 | Chan et al. | |

FOREIGN PATENT DOCUMENTS

| | | |
|---|---|---|
| JP | 2017003904 A | 1/2017 |
| JP | 2017026666 A | 2/2017 |
| WO | 9745730 A1 | 12/1997 |
| WO | 9838490 A1 | 9/1998 |
| WO | 2003014797 A1 | 2/2003 |
| WO | 2017001680 A1 | 1/2017 |
| WO | 2017165343 A2 | 9/2017 |

\* cited by examiner

MICROSCOPE

CROSS-REFERENCE TO RELATED APPLICATIONS

This application claims the benefit of Japanese Patent Application No. 2018-072067, the content of which is incorporated herein by reference.

TECHNICAL FIELD

The present invention relates to a microscope.

BACKGROUND ART

In recent years, a method for evaluating drug efficacy by acquiring microscopic image data of a three-dimensional cultured cell such as a spheroid or an organoid and then screening the acquired microscopic image data using image analysis technique is attracting attention. Further, in recent years, it has been required to analyze intracellular organelles of individual cells configuring a three-dimensional cultured cell, and images with high resolution are inevitably required.

On the other hand, in cell screening, it is required to reduce the cost required for a large amount of storage and the cost for data analysis, and it is desired that the number of imaging pixels required in determining the image data amount be as small as possible as long as resolution necessary for analysis is acquired. Accordingly, the resolution on pixel pitch determined by imaging pixel number and imaging area must be appropriately set in consideration of optical resolution.

The necessity of high resolution is also required in conventional analysis of two-dimensional cultured cells, in other words, analysis of monolayer cells. However, in imaging a two-dimensional cultured cell, since the cell is present in the entire region of a bottom surface of a well, it is only required to capture an image of one or a predetermined plurality of spots with an imaging area smaller than the bottom surface of the well, and then the acquired imaging data is subjected to statistical analysis. Therefore, the accuracy of the imaging position was not conventionally required.

On the other hand, in order to image a sample such as a spheroid accommodated in the well of a microplate with high resolution and to avoid accumulation of useless pixel data containing no sample, it is important to perform the imaging with magnification being set as high as possible after placing the entire spheroid within the visual field of a microscope. For this, it is necessary to accurately detect a representative position of the spheroid, in other words, a central position of the spheroid, in advance, before acquiring a high-resolution image, and to adjust the representative position of the spheroid to an optical axis of an objective lens at the time of imaging.

Means conventionally known for solving the above-mentioned problem is, for example, a method for mounting a low-magnification objective lens and a high-magnification objective lens on a switching device, determining the imaging position of an object by imaging the sample in the entire well region with the low-magnification objective lens, and subsequently performing high-resolution imaging by switching to the high-magnification objective lens (for example, refer to PTL 1).

CITATION LIST

Patent Literature

{PTL 1}
Japanese Translation of PCT Internal Application, Publication No. 2000-509827

SUMMARY OF INVENTION

A first aspect of the present invention is a microscope including a movable stage that supports a plurality of sample containers arranged in an array so as to be movable in a horizontal direction, a first imaging unit having a first objective lens and configured to acquire imaging data of a sample accommodated in each of the sample containers, a second imaging unit having a second objective lens higher in magnification than the first objective lens and configured to acquire imaging data of the sample accommodated in each of the sample containers, a representative position determination unit configured to determine a representative position of the sample based on the imaging data of the sample for each of the sample containers obtained by the first imaging unit, and a control unit configured to cause the first imaging unit and the second imaging unit to sequentially acquire imaging data of the sample in each of the sample containers by causing the movable stage to move the sample containers with respect to the first imaging unit and the second imaging unit. The control unit causes the first imaging unit to acquire the imaging data for the sample in one of the sample containers, and then causes the movable stage to adjust the representative position of the sample determined by the representative position determination unit based on the imaging data acquired by the first imaging unit to an optical axis of the second objective lens, and then causes the second imaging unit to acquire the imaging data, while causing the first imaging unit to acquire the imaging data of the sample in another of the sample containers in synchronization with acquisition of the imaging data by the second imaging unit.

DESCRIPTION OF EMBODIMENTS

First Embodiment

A microscope device (microscope) according to a first embodiment of the present invention will be described in detail below with reference to attached drawings.

Figure 1:
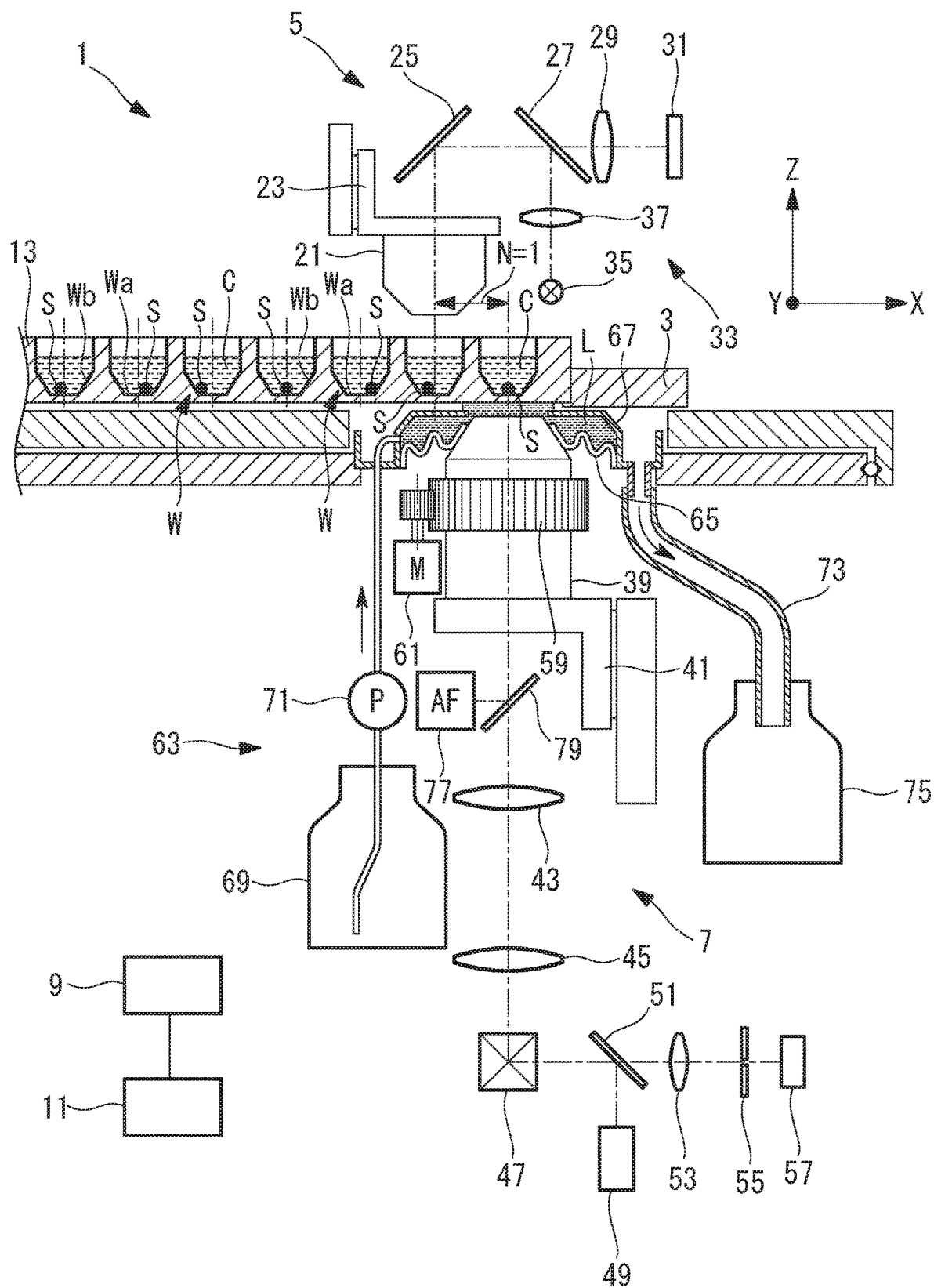
FIG. 1 is a diagram illustrating a schematic configuration of a microscope device according to a first embodiment of the present invention.

As illustrated in FIG. 1, a microscope device 1 according to the present embodiment includes a movable stage 3 for supporting a microplate 13 having a plurality of wells (sample containers) W arranged in an array so as to be movable in the horizontal direction, a first imaging unit 5 and a second imaging unit 7 configured to acquire imaging data of a spheroid (sample) S accommodated in each well W, a computer (the representative position determination unit) 9 configured to determine a central position (representative position) for each spheroid S, and a controller (control unit) 11 configured to cause the first imaging unit 5 and the second imaging unit 7 to sequentially acquire imaging data of the spheroid S in each well W.

The spheroid S is fluorescently labeled. The diameter of the spheroid S is, for example, approximately 200 μm.

Figure 2:
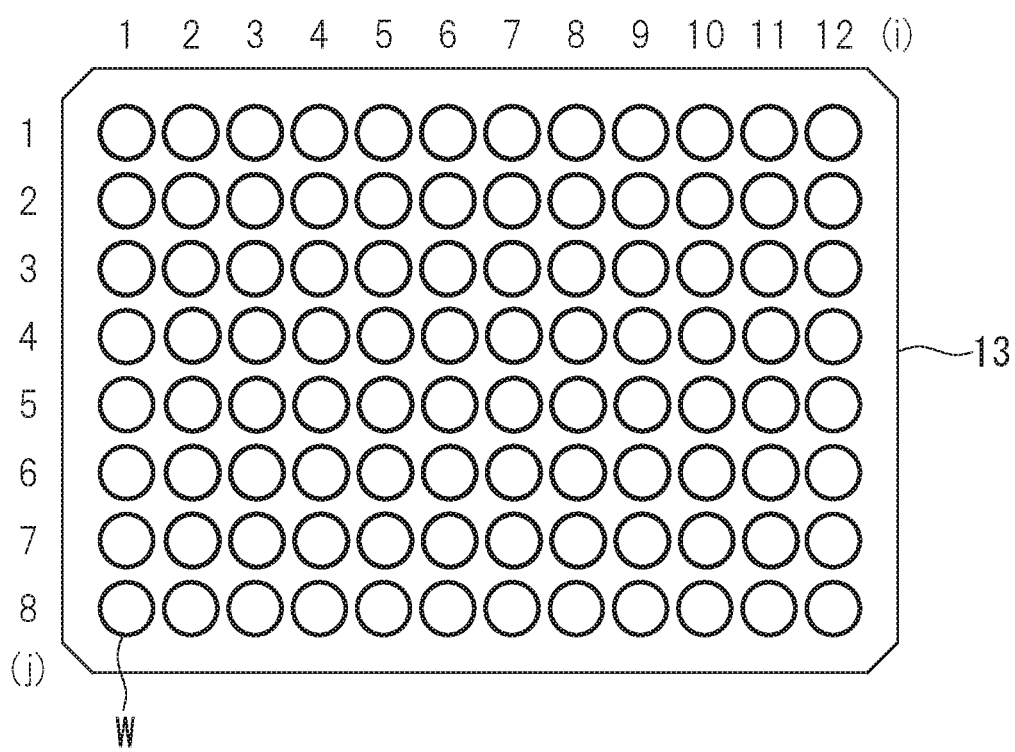
FIG. 2 is a diagram illustrating a microplate to be used by the microscope device illustrated in FIG. 1, which is seen from above in a vertical direction.
Figure 2:
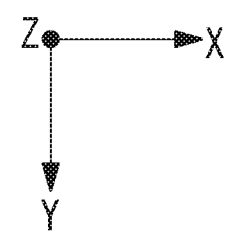

For example, as illustrated in FIG. 2, the microplate 13 has m×n wells W arrayed vertically and horizontally at equal intervals (i=1 to m, j=1 to n, and m>n). For example, the microplate 13 has the number of wells of 12×8=96 (i=1 to 12, j=1 to 8) and a well pitch, which is the interval between centers of neighboring two wells W in vertical and horizontal directions, of 9 mm.

Each well W is configured by an optically transparent material and formed in a bottomed cylindrical shape having a bottom part at one end thereof. An upper surface of the bottom part of the well W is referred to as a bottom surface Wa. In the present embodiment, it is assumed that the bottom surface Wa has the size of approximately 1 mm in diameter. These wells W have inclined surfaces Wb each being gradually tapered off from a midway position in the depth direction toward the bottom surface Wa. Each well W accommodates one spheroid S together with culture solution C.

By causing the spheroid S formed in a hanging drop with the droplet being hanged to fall into well W together with the hanging drop, the spheroid S slides down the inclined surface Wb of the well W and lands on the bottom surface Wa. Since the diameter of the spheroid S is approximately 200 μm, the position on the bottom surface Wa where the spheroid S finally lands is not constant. It may sometimes land at the center of the bottom surface Wa of the well W, or in a peripheral region of the bottom surface Wa.

The movable stage 3 fixes the microplate 13 in a horizontally placed state. Hereinafter, in the state where the microplate 13 is horizontally supported by the movable stage 3, a direction in which twelve wells W are arrayed is referred to as X direction, and a direction in which eight wells W are arrayed is referred to as Y direction.

The movable stage 3 includes a motor (not illustrated) and can electrically drive the microplate 13 to move in both the X direction and the Y direction. Hereinafter, a vertical direction orthogonal to each of the X direction and the Y direction is referred to as Z direction.

The first imaging unit 5 is arranged above the microplate 13 supported by the movable stage 3. The first imaging unit 5 includes a low-magnification objective lens (first objective lens) 21 having 4 times magnification and arranged so as to face vertically downward, an aiming unit 23 configured to cause the low-magnification objective lens 21 to move in the Z direction, a reflection mirror 25, a half mirror 27, an image formation lens 29, and a camera 31. The reason why the optical axis of the low-magnification objective lens 21 is bent by the reflection mirror 25 is to suppress the height of the device.

The aiming unit 23 adjusts the focal point to a Z position that is approximately 100 μm from the bottom surface Wa of the well W. Due to the smallness of NA (i.e., numerical aperture), the low-magnification objective lens 21 has a focal depth sufficient for determining the position and diameter of the spheroid S even when the focal point is not adjusted to each spheroid S. When the size of the spheroid S is not known at all and the variation in size is large, the diameter of the spheroid S may be made clear, for example, by driving the aiming unit 23 according to the contrast method.

The camera 31 is, for example, a CCD camera. The camera 31 can secure an imaging area of approximately 2×2 mm in combination with the low-magnification objective lens 21 and the image formation lens 29. Accordingly, even when the outermost edge of the bottom surface Wa of the well W is aligned on the optical axis of the low-magnification objective lens 21, the entire region of the well W can be imaged.

A reflection lighting device 33 for causing the illumination light to reflect on the spheroid S toward the first imaging unit 5 along the optical axis of the low-magnification objective lens 21 by irradiating the spheroid S with illumination light is connected to the first imaging unit 5. The reflection lighting device 33 includes a halogen lamp 35 for emitting the illumination light and a converging lens 37 for causing the illumination light to enter the half mirror 27 by converging the illumination light emitted from the halogen lamp 35.

In the reflection lighting device 33 and the first imaging unit 5, the illumination light emitted from the halogen lamp 35 is converged by the converging lens 37 and reflected by the half mirror 27 and subsequently reflected by the reflection mirror 25 and reaches the low-magnification objective lens 21, so that the spheroid S in the well W is irradiated with illumination light from above in the vertical direction. The light reflected on the spheroid S by the irradiation of the illumination light is converged by the low-magnification objective lens 21 and advances in the opposite direction along the optical path of the illumination light, and is subsequently reflected by the reflection mirror 25 and penetrates the half mirror 27. Then, the reflected light is converged by the image formation lens 29 and imaged by the camera 31.

The second imaging unit 7 is, for example, configured by a confocal point microscope, and is arranged below the microplate 13 supported by the movable stage 3. The second imaging unit 7 includes a high-magnification objective lens (second objective lens) 39 having 25 times magnification and arranged so as to face vertically upward, an aiming unit 41 configured to cause the high-magnification objective lens 39 to move in the Z direction, an image formation lens 43, a pupil projection lens 45, an XY galvanometer mirror scanner 47, a laser 49 for emitting a laser beam (illumination light), a dichroic mirror 51, a confocal point lens 53, a pinhole 55, and a photodetector 57 such as a photomultiplier tube.

The high-magnification objective lens 39 is, for example, an immersion objective lens. The high-magnification objective lens 39 is provided with a correction ring (spherical aberration correction unit) 59 for correcting spherical aberration. The correction ring 59 is connected to a correction ring driving device 61 for rotating and driving the correction ring 59.

The dichroic mirror 51 transmits fluorescence emitted from the spheroid S while reflecting the laser beam emitted from the laser 49.

The XY galvanometer mirror scanner 47 exerts a variable power function for changing the image magnification by changing the scanning area of the laser beam. By controlling the scanning angle of a mirror (not illustrated) of the XY galvanometer mirror scanner 47, the scanning area of the laser beam can be changed.

The photodetector 57 functions as imaging pixel number changing means for changing the number of imaging pixels. More specifically, the imaging pixel number can be changed by changing the division time of light detection by the photodetector 57 with respect to laser beam scanning by the XY galvanometer mirror scanner 47. The XY galvanometer mirror scanner 47 and the photodetector 57 can appropriately set the resolution on the pixel pitch determined by the imaging pixel number and the imaging area and the optical resolution.

The second imaging unit 7 is equipped with a liquid supply device 63 for supplying a liquid L such as pure water to a clearance between the high-magnification objective lens 39 and the bottom part of the well W. The liquid supply device 63 includes a bellows 65 and a cover part 67 that cooperatively form a flow channel for supplying the liquid L to the clearance between the high-magnification objective lens 39 and the bottom part of the well W and a flow channel for discharging the liquid L from the clearance between the high-magnification objective lens 39 and the bottom part of the well W, a water supply tank 69 for storing the liquid L, a pump 71 for supplying the liquid L in the water supply tank 69 to the clearance between the high-magnification objective lens 39 and the bottom part of the well W via the flow channel formed by the bellows 65 and the cover part 67, a piping 73 for discharging the liquid L from the flow channel formed by the bellows 65 and the cover part 67, and a drainage tank 75 for containing the liquid L discharged via the piping 73.

When the high-magnification objective lens 39 is arranged to face the spheroid S via the bottom surface Wa of the well W, the liquid supply device 63 supplies water to fill the clearance between a tip lens (not illustrated) of the high-magnification objective lens 39 and the bottom part of the well W with the liquid L. The water supply is not always necessary every time the high-magnification objective lens 39 faces a new spheroid S and may be omitted appropriately.

Further, the second imaging unit 7 is equipped with a phase difference type auto-focusing device 77 having an infrared laser (not illustrated) and a dichroic mirror 79 that transmits visible light while reflecting infrared light emitted from the infrared laser of the auto-focusing device 77.

The dichroic mirror 79 is arranged on the optical axis of the high-magnification objective lens 39 between the high-magnification objective lens 39 and the image formation lens 43. The auto-focusing device 77 detects the bottom surface Wa of the well W. Further, the auto-focusing device 77 adjusts the focal point of the high-magnification objective lens 39 to the bottom surface Wa of the well W by driving the aiming unit 41.

In the second imaging unit 7, the laser beam emitted from the laser 49 is reflected by the dichroic mirror 51 and two-dimensionally scanned by the XY galvanometer mirror scanner 47, and is then sequentially passes through the pupil projection lens 45, the image formation lens 43, and the dichroic mirror 79. The high-magnification objective lens 39 irradiates the spheroid S in the well W with this laser beam, from the vertical lower side. Fluorescence emitted from the spheroid S when irradiated with the laser beam is converged by the high-magnification objective lens 39, advances in the opposite direction along the optical path of the laser beam, and sequentially passes through the dichroic mirror 79, the image formation lens 43, and the pupil projection lens 45. Further, the fluorescence passes through the dichroic mirror 51 via the XY galvanometer mirror scanner 47 and is converged by the confocal point lens 53. Then, after passing through the pinhole 55, the fluorescence is detected by the photodetector 57.

The optical axis of the low-magnification objective lens 21 of the first imaging unit 5 and the optical axis of the high-magnification objective lens 39 of the second imaging unit 7 are arranged apart from each other by a distance comparable to one well pitch (N=1). More specifically, the optical axis of the low-magnification objective lens 21 and the optical axis of the high-magnification objective lens 39 are arranged apart from each other in the X direction by a distance comparable to one well W.

The computer 9 includes a central processing unit (CPU) serving as an operation unit and generates an image of the spheroid S based on imaging data acquired by the photodetector 57. Further, the computer 9 determines the central position of each spheroid S based on imaging data of the spheroid S acquired by the camera 31 for each well W. Further, the computer 9 measures the diameter of the spheroid S, and on the premise that the spheroid S is a sphere, determines a spherical aberration correction value based on the measured diameter. Further, when the second imaging unit 7 acquires imaging data, the computer 9 corrects the spherical aberration correction value according to the observation position of the spheroid S in the Z direction.

For example, the controller 11 includes a central processing unit (CPU), a main storage unit such as a read only memory (ROM) and a random access memory (RAM), an auxiliary storage unit such as a hard disk drive (HDD), an output unit configured to output data, and an external interface or the like (not illustrated) that performs transmission/reception of various data with an external device. The auxiliary storage unit stores various programs. The CPU reads programs from the auxiliary storage unit to the main storage unit such as the RAM and executes the programs to control the movable stage 3, the camera 31, the aiming unit 41 of the second imaging unit 7, the pump 71, the correction ring driving device 61, the light scanning range of the XY galvanometer mirror scanner 47, and the division time of light detection by the photodetector 57.

For example, when executing a driving program, the controller 11 drives the movable stage 3 to cause the microplate 13 to move in the X direction and the Y direction with respect to the first imaging unit 5 and the second imaging unit 7. Accordingly, this operation changes the spheroid S of the well W whose imaging data is to be acquired by the first imaging unit 5 and the second imaging unit 7. For example, when executing an aberration correction program, the controller 11 controls the correction ring driving device 61 based on the spherical aberration correction value of the spheroid S determined by the computer 9. Accordingly, the correction ring 59 can be driven by the correction ring driving device 61.

For example, when executing an imaging program, the controller 11 causes the first imaging unit 5 to acquire imaging data of the spheroid S in the same well W, prior to the second imaging unit 7. Then, for the spheroid S in the same well W, the controller 11 causes the computer 9 to determine the central position of the spheroid S based on the imaging data acquired by the first imaging unit 5. Further, after adjusting the central position of the spheroid S to the optical axis of the high-magnification objective lens 39 by driving the movable stage 3 based on the determination of the computer 9, the controller 11 causes the second imaging unit 7 to acquire imaging data of the spheroid S. In addition, the controller 11 causes the first imaging unit 5 to acquire imaging data of the spheroid S in another well W in synchronization with the acquisition of imaging data by the second imaging unit 7.

Functions of the microscope device 1 having the above-mentioned configuration will be described with reference to flowcharts illustrated in FIGS. 3 to 5. Since the microplate 13 adopted in the present embodiment has the number of wells of 12×8=96 (i=1 to 12, j=1 to 8), m is 12 and n is 8. Further, the interval (N) between the optical axis of the low-magnification objective lens 21 and the optical axis of the high-magnification objective lens 39 is 1, namely N=1.

Figure 3:
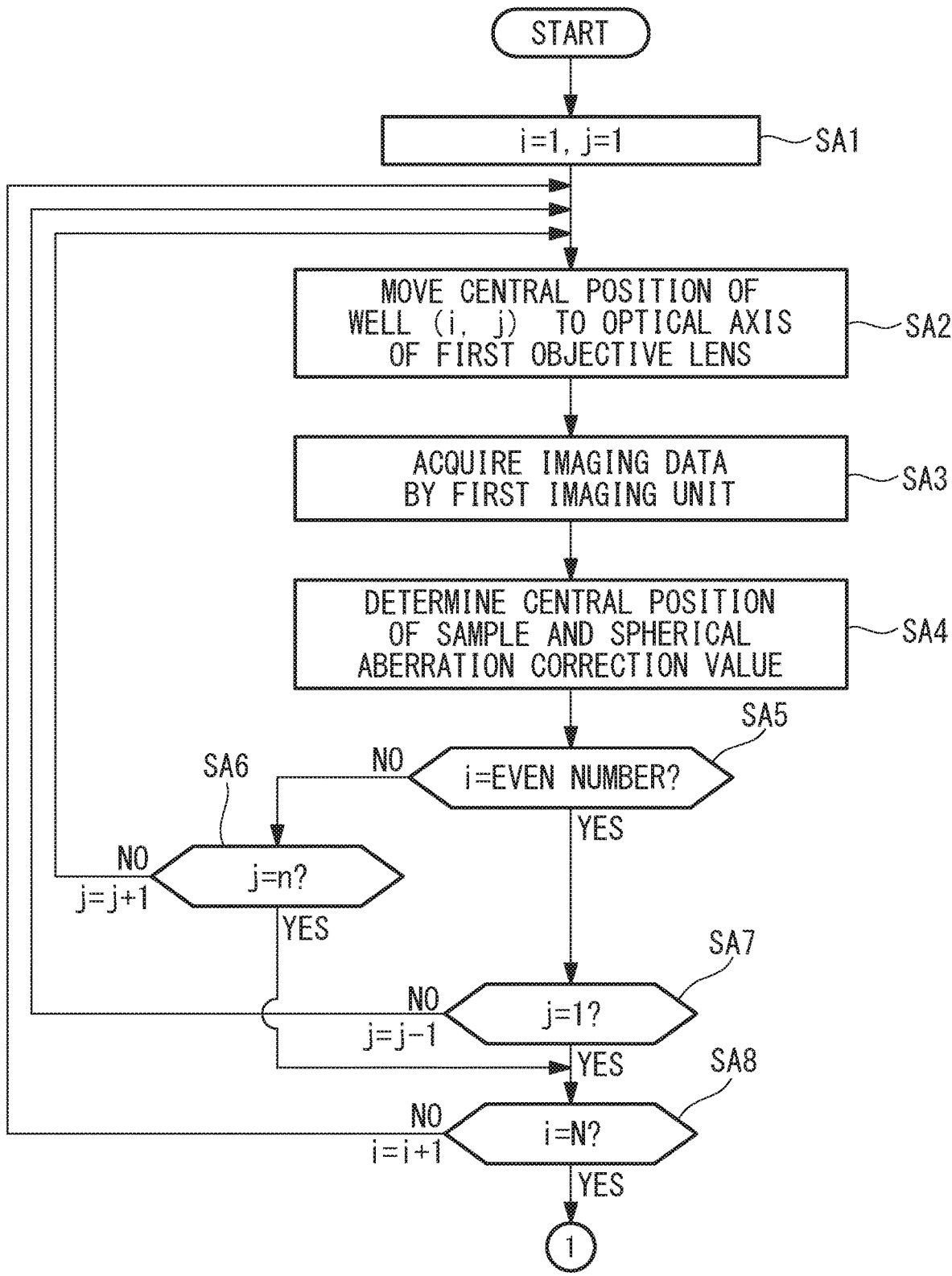
FIG. 3 is a flowchart illustrating acquisition of imaging data by only a first imaging unit.

In order to observe the spheroid S accommodated in each well W of the microplate 13 by the microscope device 1 according to the present embodiment, as illustrated in the flowchart of FIG. 3, first, the first imaging unit 5 preliminarily reads sequential wells from W (i=1, j=1) to W (i=1, j=8).

More specifically, first, the controller 11 initializes the variables, namely i=1 and j=1 (Refer to step SA1). Next, the controller 11 drives the movable stage 3 so as to align the central position of the well W (i=1, j=1) on the optical axis of the low-magnification objective lens 21 of the first imaging unit 5 (Refer to step SA2). Then, the controller 11 causes the first imaging unit 5 to acquire imaging data of the spheroid S in the well W (i=1, j=1) (Refer to step SA3).

The imaging data of the spheroid S of the well W (i=1, j=1) acquired by the first imaging unit 5 is sent to the computer 9, and subjected to image processing performed by the computer 9, in which the central position of the spheroid S is determined. Further, the controller 11 causes the computer 9 to measure the diameter of the spheroid S and determine the spherical aberration correction value based on the measured diameter (Refer to step SA4).

Next, the controller 11 determines whether the present setting is i=even number (Refer to step SA5). Further, the controller 11 determines whether the present setting is j=n (Refer to step SA6) or j=1 (Refer to step SA7). When the present setting is i=1 and j=1, if the variable i is not an even number ("NO" in step SA5), and further if the variable j is not equal to n ("NO" in step SA6), the controller 11 increments the variable j by 1, namely j=j+1. In this case, the controller 11 changes the setting to i=1 and j=2, and the processing returns to step SA2.

Figure 6:
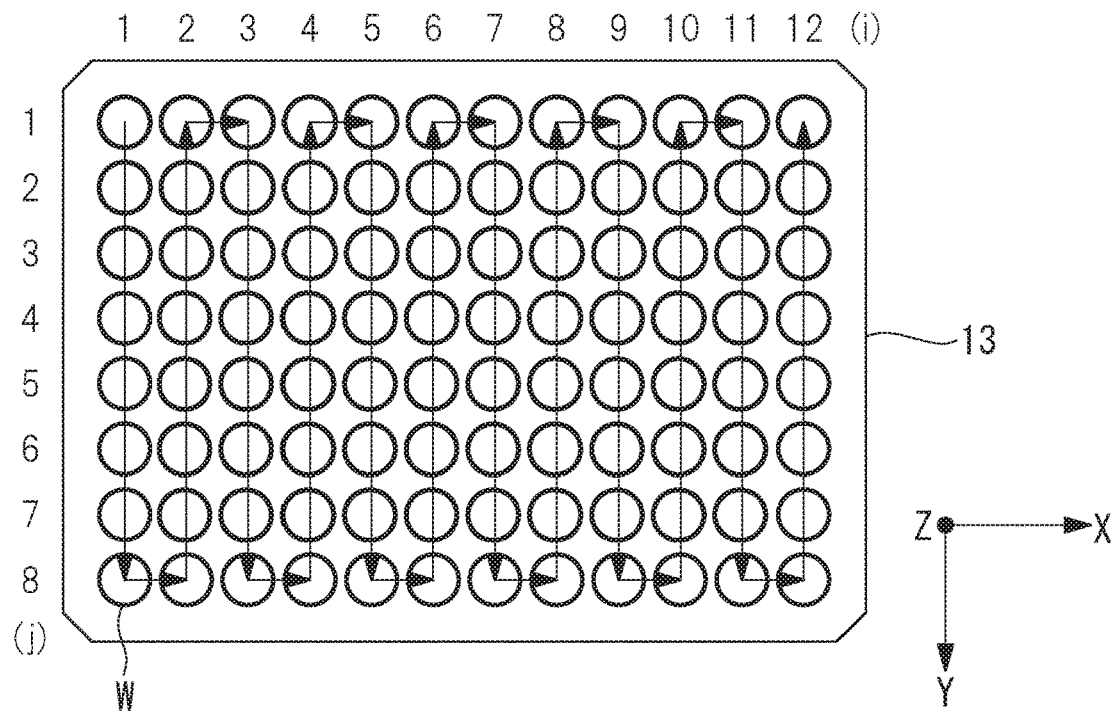
FIG. 6 is a diagram illustrating an example of the order of imaging wells by the first imaging unit.

Then, the movable stage 3 moves the microplate 13 in the Y direction, as illustrated in FIG. 6, and the controller 11 sequentially performs the above-mentioned steps SA2 to SA6 for another wells from W (i=1, j=2) to W (i=1, j=8), similar to the well W (i=1, j=1).

When the processing of steps SA2 to SA6 completes for the well W (i=1, j=8), that is, when the setting is changed to i=1 and j=8, the condition j=n is satisfied ("YES" in step SA6). Therefore, the controller 11 determines whether the present setting is i=N (Refer to step SA8). In the present embodiment, since the interval (N) between the optical axis of the low-magnification objective lens 21 and the optical axis of the high-magnification objective lens 39 is 1, namely, N=1 ("YES" in step SA8), the controller 11 terminates the preliminary reading.

Figure 4:
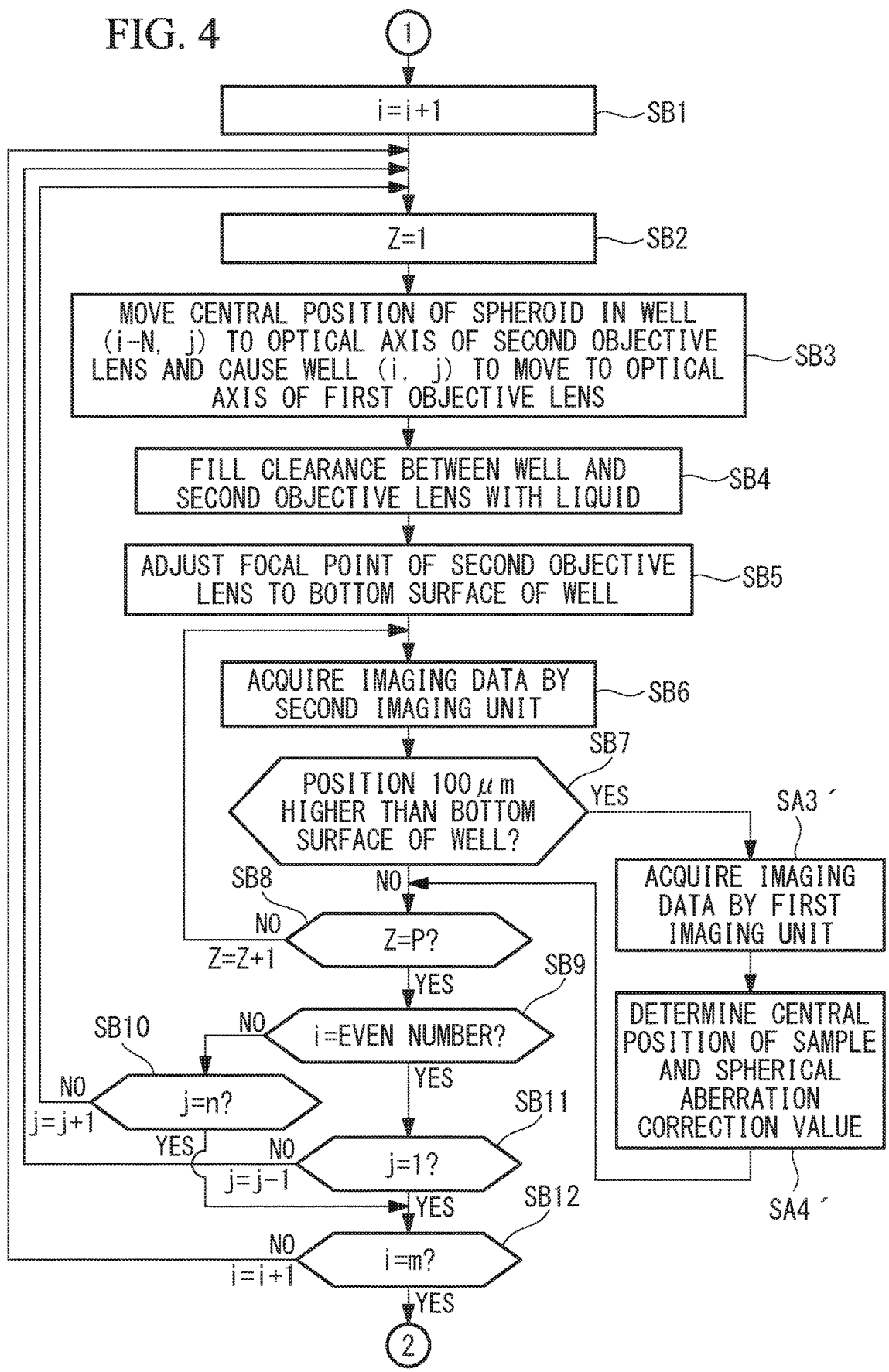
FIG. 4 is a flowchart illustrating acquisition of imaging data performed by the first imaging unit and a second imaging unit synchronously.

Next, as illustrated in the flowchart of FIG. 4, the controller 11 increments the variable i, namely i=i+1. In this case, the controller 11 sets the variables to i=2 and j=8 (Refer to step SB1). Then, in the following two processes, for spheroids S in respective wells W, acquisition of imaging data by the second imaging unit 7 for the spheroid S in the well W whose imaging data has been preliminarily acquired by the first imaging unit 5 and acquisition of imaging data by the first imaging unit 5 for another spheroid S in the well W are sequentially performed synchronously.

More specifically, in one process, first, the controller 11 sets the variable Z, namely the observation position of the second imaging unit in the Z direction, to 1 (i.e., Z=1) (Refer to step SB2). Further, the controller 11 sets an observation object by the second imaging unit 7 to well W (i−N, j). That is, in this case, the observation object is set to the well W (i=1, j=8).

Next, the controller 11 drives the movable stage 3 according to the central position of the spheroid S in the well W (i=1, j=8) determined by the computer 9 and adjusts the central position of the spheroid S to the optical axis of the high-magnification objective lens 39 (Refer to step SB3). Since it is just after the imaging of well W (i=1, j=8) by the first imaging unit 5, the moving distance of the movable stage 3 can be shortened by initially adjusting the central position of the spheroid S in the well W (i=1, j=8), not the well W (i=1, j=1), to the optical axis of the high-magnification objective lens 39.

Next, the controller 11 drives the pump 71 to fill the clearance between the tip lens of the high-magnification objective lens 39 and the bottom surface of the well W with the liquid L (Refer to step SB4). Then, the controller 11 drives the auto-focusing device 77 so as to adjust the focal point of the high-magnification objective lens 39 to the bottom surface Wa of the well W (i=1, j=8) (Refer to step SB5).

In this state, the second imaging unit 7 acquires imaging data of the spheroid S in the well W (i=1, j=8) (Refer to step SB6). Then, the controller 11 drives the aiming unit 41 at a preset Z step interval of, for example, 1 μm until the Z position changes to, for example, a predetermined step number P. At each changed Z position, the second imaging unit 7 repetitively acquires imaging data of the spheroid S in the well W (i=1, j=8) (Refer to steps SB6 to SB8). A plurality of imaging data acquired by the second imaging unit 7, which are different in the Z position of the spheroid S in the well W (i=1, j=8), is sent to the computer 9. The computer 9 generates a three-dimensional XYZ image.

In this case, the computer 9 corrects the spherical aberration correction value of the spheroid S in the well W (i=1, j=8) according to the Z position. Then, for each Z position, the controller 11 controls the correction ring driving device 61 according to the corrected spherical aberration correction value, so that the correction ring 59 corrects the spherical aberration. Although the step number P in the Z direction for acquiring imaging data may be determined in advance, it is desired to stop the imaging at the time of acquiring no fluorescence image by the image processing.

In the other process, when the central position of the spheroid S in the well W (i=1, j=8) is adjusted to the optical axis of the high-magnification objective lens 39 in step SB3, a well W (i=2, j=8) neighboring to the well W (i=1, j=8) is arranged on the optical axis of the low-magnification objective lens 21 of the first imaging unit 5, as illustrated in FIG. 6.

Then, when the second imaging unit 7 acquires imaging data at a Z position approximately 100 μm higher than the bottom surface Wa of the well W (i=1, j=8) ("YES" in step SB7), the first imaging unit 5 acquires imaging data of the spheroid S in the well W (i=2, j=8) (Refer to step SA3').

In this case, although the center of the well W (i=2, j=8) is not on the optical axis of the low-magnification objective lens 21, since the imaging area secured for the first imaging unit 5 is comparable to twice the diameter of well W (i=2, j=8), the first imaging unit 5 can image the spheroid S in the well W (i=2, j=8) without missing it out.

The imaging data acquired by the first imaging unit 5 is sent to the computer 9. The computer 9 determines the central position of the spheroid S in the well W (i=2, j=8) and determines the spherical aberration correction value by measuring the diameter of the spheroid S (Refer to step SA4'). The determined spherical aberration correction value is used in the acquisition of an XYZ image by the second imaging unit 7.

Subsequently, the controller 11 determines that the observation position of the well W (i=1, j=8) by the second imaging unit 7 in the depth direction, that is, the Z position, has changed to the step number P ("YES" in step SB8), the controller 11 determines whether the present setting is i=even number (Refer to step SB9). Further, the controller 11 determines whether the present setting is j=n (Refer to step SB10) or j=1 (Refer to step SB11).

Although the present setting is i=2 and j=8 and therefore i=even number ("YES" in step SB9), since the variable j is not 1 ("NO" in step SB11), the controller 11 decrements the variable j by one, i.e., j=j−1. In this case, the setting is changed to i=2 and j=7, and the processing returns to step SB2.

Then, the controller 11 drives the movable stage 3 so that the well W is moved with respect to the first imaging unit 5 and the second imaging unit 7. The second imaging unit 7 repeats the processing of steps SB2 to SB8 for each well W, and the first imaging unit 5 repeats the processing of steps SA3' and SA4'.

Figure 7:
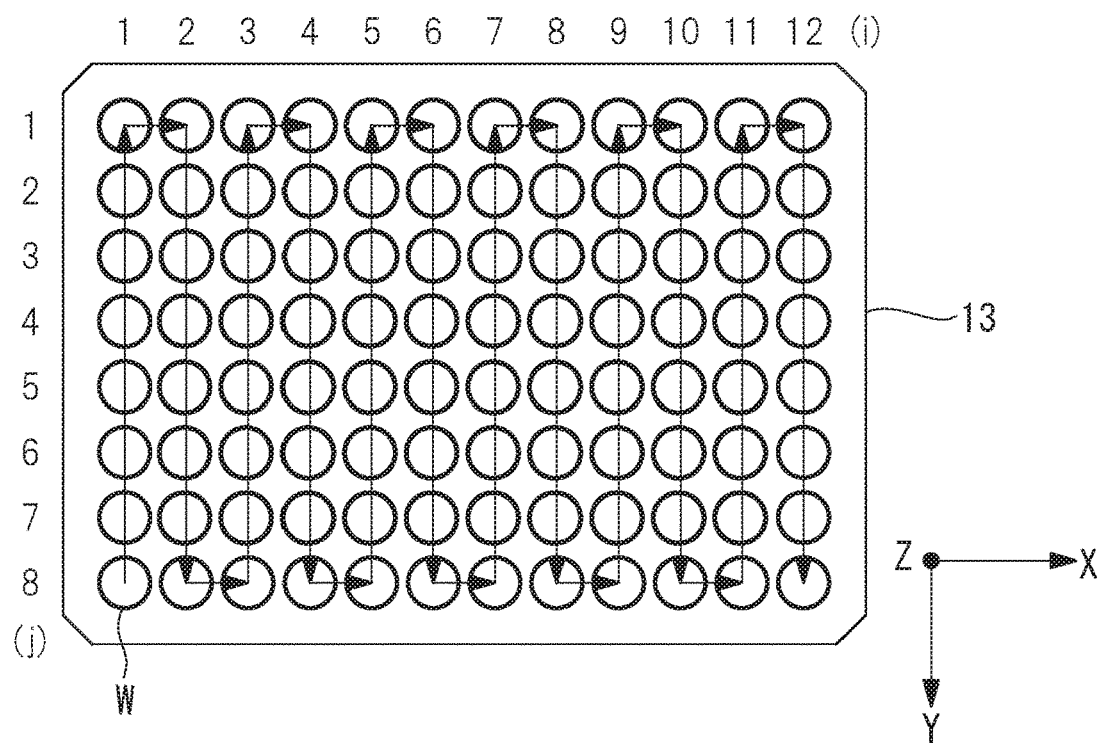
FIG. 7 is a diagram illustrating an example of the order of imaging wells by the second imaging unit.

More specifically, for the second imaging unit 7, the processing of steps SB2 to SB8 is repeated while the central position of the spheroid S in each well W is sequentially adjusted to the optical axis of the high-magnification objective lens 39 as illustrated in FIG. 7, from well W (i=1, j=8) to well W (i=1, j=1)→from well W (i=2, j=1) to well W (i=2, j=8)→from well W (i=3, j=8) to well W (i=3, j=1)→from well W (i=4, j=1) to well W (i=4, j=8)→from well W (i=5, j=8) to well W (i=5, j=1)→from well W (i=6, j=1) to well W (i=6, j=8)→from well W (i=7, j=8) to well W (i=7, j=1)→from well W (i=8, j=1) to well W (i=8, j=8)→from well W (i=9, j=8) to well W (i=9, j=1)→from well W (i=10, j=1) to well W (i=10, j=8)→from well W (i=11, j=8) to well W (i=11, j=1). Then, the computer 11 generates a three-dimensional XYZ image of each spheroid S.

On the other hand, for the first imaging unit 5, the processing of steps SA3' and SA4' is repeated while each well W is sequentially moved on the optical axis of the low-magnification objective lens 21 as illustrated in FIG. 6, from well W (i=2, j=8) to well W (i=2, j=1)→from well W (i=3, j=1) to well W (i=3, j=8)→from well W (i=4, j=8) to well W (i=4, j=1)→from well W (i=5, j=1) to well W (i=5, j=8)→from well W (i=6, j=8) to well W (i=6, j=1)→from well W (i=7, j=1) to well W (i=7, j=8)→from well W (i=8, j=8) to well W (i=8, j=1)→from well W (i=9, j=1) to well W (i=9, j=8)→from well W (i=10, j=8) to well W (i=10, j=1)→from well W (i=11, j=1) to well W (i=11, j=8)→from well W (i=12, j=8) to well W (i=12, j=1).

In this case, when the controller 11 causes the second imaging unit 7 to acquire imaging data for each well W at the Z position approximately 100 μm higher than the bottom surface Wa (Refer to step SB6), the first imaging unit 5 acquires imaging data of the spheroid S in another well W (Refer to step SA3').

When the processing of steps SA3' and SA4' completes for the well W (i=12, j=1), that is, when the setting has been changed to i=12 and j=1 ("YES" in step SB9 and "YES" in step SB11), the controller 11 determines whether the present setting is i=m (Refer to step SB12). In the present embodiment, since m is 12 ("YES" in step SB12), the acquisition of imaging data by the first imaging unit 5 terminates.

Figure 5:
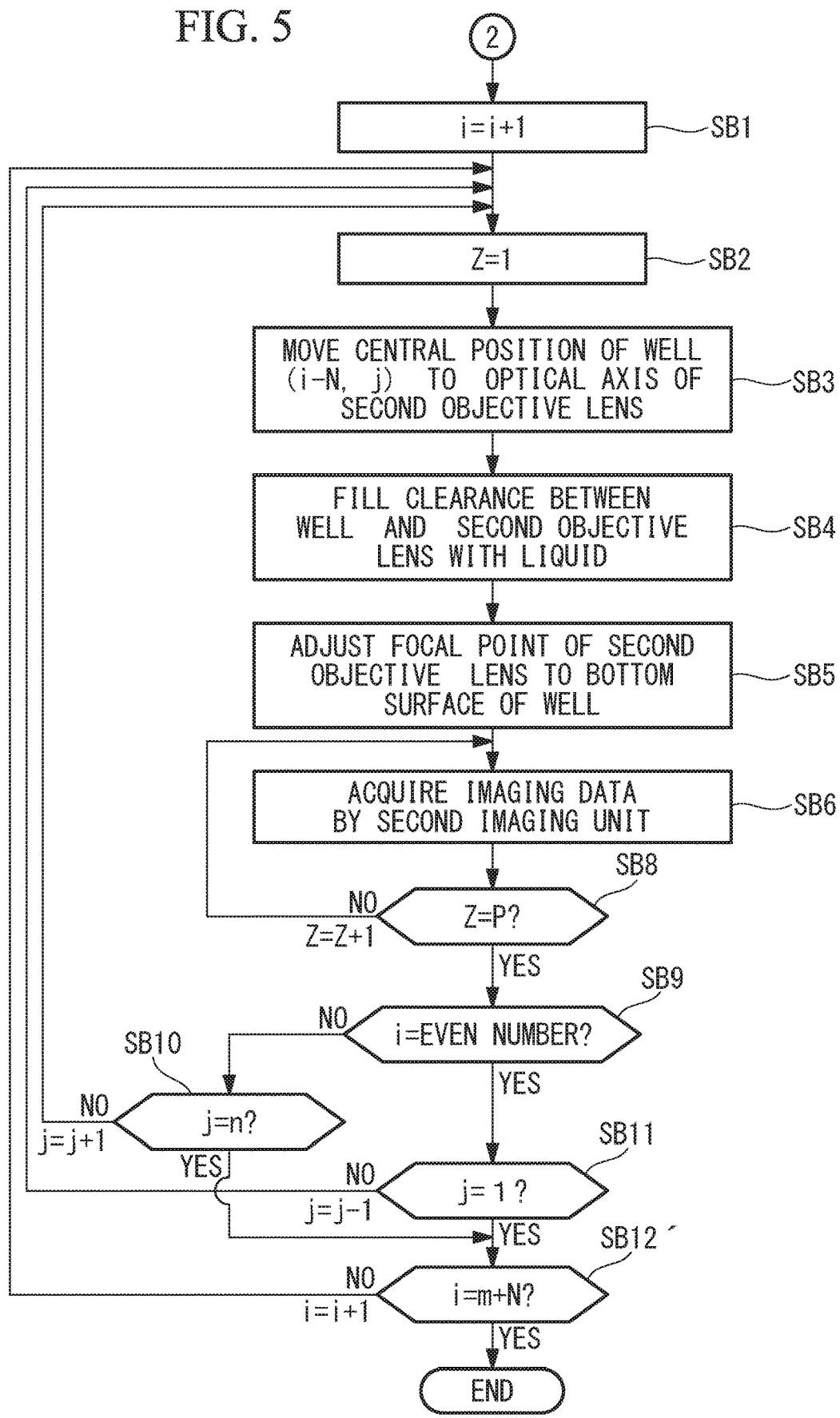
FIG. 5 is a flowchart illustrating acquisition of imaging data by the second imaging unit only.

Next, as illustrated in the flowchart of FIG. 5, the controller 11 increments the variable i by one, i.e., i=i+1. In this case, i=13 and j=1 are set (Refer to step SB1). Then, in the state where the acquisition of imaging data by the first imaging unit 5 has terminated, the second imaging unit 7 performs the processing of steps SB1 to SB10 for each of well W (i=12, j=1) to well W (i=12, j=8).

When the processing of steps SB2 to SB10 completes for the well W (i=12, j=8), that is, when the setting has been changed to i=13 and j=8, since the condition j=n is satisfied ("YES" in step SB10), the controller 11 determines whether the present setting is i=m+N (Refer to step SB12'). In the present embodiment, since m is 12 and N is 1 ("YES" in step SB12'), the acquisition of imaging data by the second imaging unit 7 terminates. Finally, when the computer 9 generates a three-dimensional XYZ image of each spheroid S, from well W (i=12, j=1) to well W (i=12, j=8), the imaging terminates.

As mentioned above, the microscope device 1 according to the present embodiment causes the first imaging unit 5 to acquire imaging data for the spheroid S in the same well W, prior to the second imaging unit 7. Accordingly, the computer 9 can easily and surely determine the central position of the spheroid S accommodated in the well W. Then, after the determination of the central position of the spheroid S by the computer 9, the second imaging unit 7 acquires imaging data in a state where the central position of the spheroid S has been adjusted to the optical axis of the high-magnification objective lens 39 by the movable stage 3. Accordingly, it is possible to suppress the second imaging unit 7 from acquiring useless imaging data not sufficiently including the spheroid S. High-resolution imaging data of the spheroid S can be efficiently acquired.

In this case, the controller 11 causes the first imaging unit 5 to acquire imaging data of the spheroid S in another well W in synchronization with the acquisition of imaging data by the second imaging unit 7. Therefore, the throughput can be improved by an amount corresponding to time overlapping between the acquisition of imaging data by the first imaging unit 5 and the acquisition of imaging data by the second imaging unit 7 when they are performed, compared to a case where the first imaging unit 5 acquires imaging data of all spheroids S and subsequently the second imaging unit 7 acquires imaging data for all spheroids S. Accordingly, high-resolution imaging data of a plurality of spheroids S can be acquired with high throughput.

In the present embodiment, the computer 9 and the controller 11 may be configured to function as the image magnification adjustment unit. More specifically, the computer 9 may be configured to acquire size information of the spheroid S in the XY plane from the imaging data of the spheroid S acquired by the first imaging unit 5, and the controller 11 may be configured to adjust the image magnification of the second imaging unit 7 by changing a laser beam scanning area of the XY galvanometer mirror scanner 47 based on the size information.

Accordingly, with respect to the optical resolution, the resolution on the pixel pitch determined by the imaging pixel number and the imaging area can be improved. Further, by changing the imaging pixel number when the image magnification of the second imaging unit 7 is determined, the resolution on the pixel pitch determined by the imaging pixel number and the imaging area can be optimized.

Further, in the present embodiment, moving means for approximately adjusting the optical axis of the low-magnification objective lens 21 to the optical axis of the high-magnification objective lens 39 may be provided. By causing the moving means to move the reflection lighting device 33 and the first imaging unit 5, the transmission lighting device for the second imaging unit 7 can be configured. Accordingly, high-magnification transmitted illumination observation using the high-magnification objective lens 39 can be performed.

Second Embodiment

Next, a microscope device (microscope) according to a second embodiment of the present invention will be described.

Figure 8:
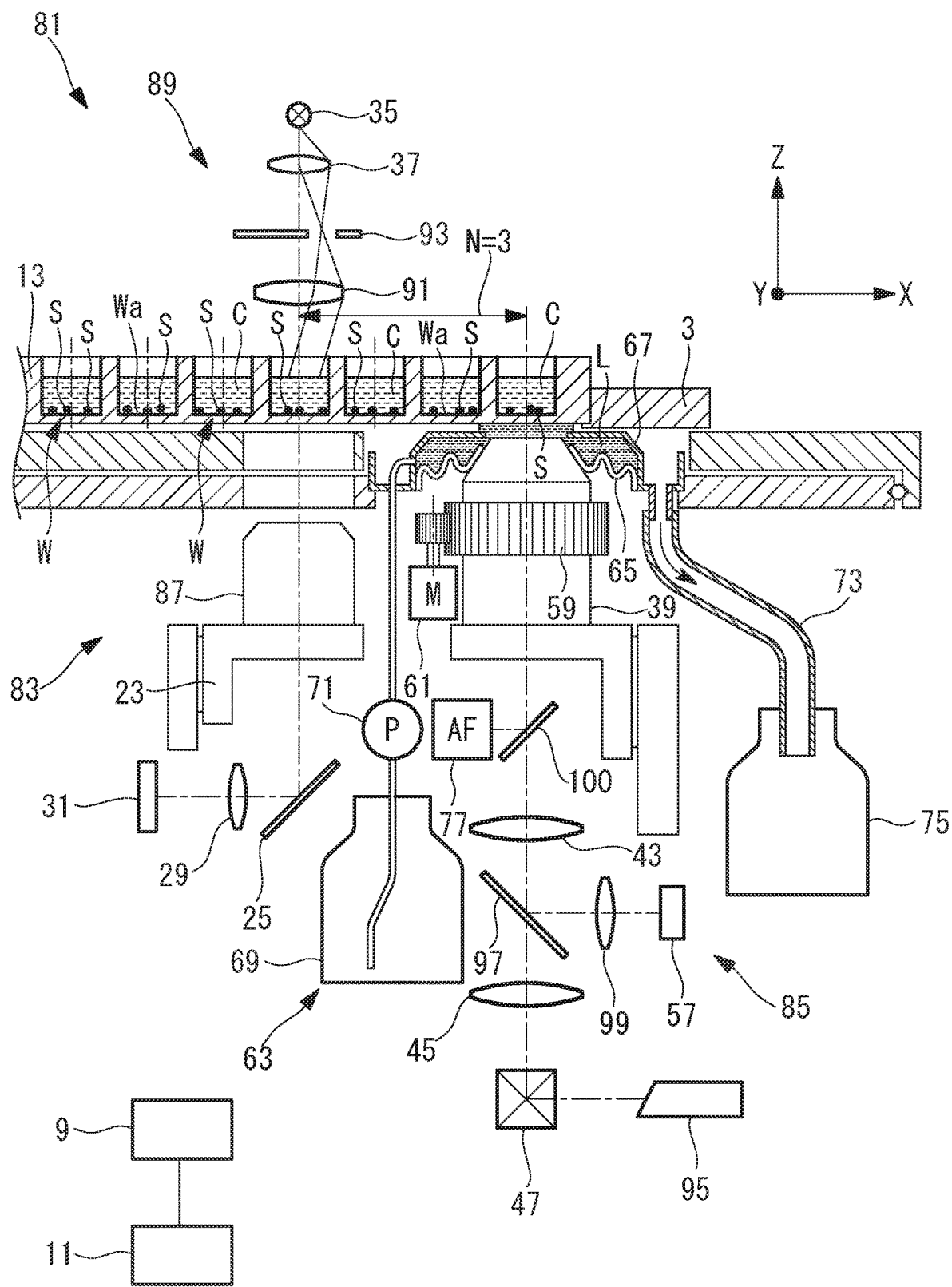
FIG. 8 is a diagram illustrating a schematic configuration of a microscope device according to a second embodiment of the present invention.

A microscope device 81 according to the present embodiment is different from that described in the first embodiment in that the first imaging unit 5 is replaced by a first imaging unit 83 arranged below the microplate 13 supported by the movable stage 3 and the second imaging unit 7 is replaced by a second imaging unit 85 that configures a multiphoton excitation microscope, as illustrated in FIG. 8.

Hereinafter, portions having configurations common to those of the microscope device 1 according to the first embodiment are denoted by the same reference numerals and not described in detail.

In the present embodiment, the well W does not have the inclined surface Wb and the size of the bottom surface Wa is approximately 6 mm in diameter. Each well W accommodates a plurality of spheroids S together with culture solution C.

The first imaging unit 83 includes a low-magnification objective lens (first objective lens) 87 having one-time magnification and arranged so as to face vertically upward, an aiming unit 23, a reflection mirror 25, an image formation lens 29, and a camera 31. The aiming unit 23, by causing the low-magnification objective lens 87 to move in the Z direction, adjusts the focal point thereof to a Z position approximately 100 μm higher than the bottom surface Wa of the well W.

In the present embodiment, the camera 31 can secure an imaging area of approximately 13×13 mm in combination with the low-magnification objective lens 87 and the image formation lens 29. Accordingly, even when the outermost edge of the bottom surface Wa of the well W is aligned on the optical axis of the low-magnification objective lens 87, the entire region of the well W can be imaged.

In the present embodiment, the reflection lighting device 33 is replaced by a transmission lighting device 89 for causing illumination light to penetrate the spheroid S toward the first imaging unit 83 along the optical axis of the low-magnification objective lens 87 by irradiating the spheroid S with illumination light.

The transmission lighting device 89 includes a halogen lamp 35, a converging lens 37, a condensing lens 91 for converting the illumination light converged by the converging lens 37 into parallel light, and a diaphragm 93 for illumination with focal illumination. The transmission lighting device 89 irradiates the spheroid S with the illumination light at an angle with respect to the optical axis of the low-magnification objective lens 87, thereby illuminating the spheroid S with focal illumination.

In the transmission lighting device 89 and the first imaging unit 83, the converging lens 37 converges the illumination light emitted from the halogen lamp 35 and the diaphragm 93 limits the optical path. Then, the condensing lens 91 converts the illumination light having passed through the diaphragm 93 into parallel light. The spheroid S in the well W is irradiated with angled parallel light from above. The transmission light having passed through the spheroid S by the irradiation of the illumination light is converged by the low-magnification objective lens 87, and is then reflected by the reflection mirror 25. Subsequently, the transmission light is converged by the image formation lens 29 and imaged by the camera 31.

The second imaging unit 85 includes a high-magnification objective lens 39, an image formation lens 43, a pupil projection lens 45, an XY galvanometer mirror scanner 47, an ultrashort pulse infrared laser 95 that generates an ultrashort pulse infrared laser beam, a dichroic mirror 97 that reflects fluorescence emitted from the spheroid S while transmitting the ultrashort pulse infrared laser beam generated by the ultrashort pulse infrared laser 95, a converging lens 99 that converges the fluorescence reflected by the dichroic mirror 97, and a photodetector 57.

Further, instead of the dichroic mirror 79, the second imaging unit 85 includes a notch type dichroic mirror 100 that reflects only infrared laser beam emitted from the auto-focusing device 77 while transmitting light of other wavelengths. The notch type dichroic mirror 100 is arranged on the optical axis of the high-magnification objective lens 39 between the high-magnification objective lens 39 and the image formation lens 43.

In the second imaging unit 85, the XY galvanometer mirror scanner 47 two-dimensionally scans ultrashort pulse infrared laser beam emitted from the ultrashort pulse infrared laser 95. The ultrashort pulse infrared laser beam passes through the pupil projection lens 45, the dichroic mirror 97, the image formation lens 43, and the notch type dichroic mirror 100. The high-magnification objective lens 39 irradiates the spheroid S in the well W with the ultrashort pulse infrared laser beam from vertically downward. Fluorescence generated from the spheroid S by the irradiation of the ultrashort pulse infrared laser beam is converged by the high-magnification objective lens 39 and returns along the optical path of the laser beam. The fluorescence passes through the notch type dichroic mirror 100 and the image formation lens 43, and is reflected by the dichroic mirror 97, and then converged by the converging lens 99, and detected by the photodetector 57.

The optical axis of the low-magnification objective lens 87 in the above-mentioned first imaging unit 83 and the optical axis of the high-magnification objective lens 39 in the second imaging unit 85 are arranged so as to be separated by a distance comparable to three times the well pitch of the microplate 13 (N=3). More specifically, the optical axis of the low-magnification objective lens 87 and the optical axis of the high-magnification objective lens 39 are arranged apart from each other by the distance comparable to three wells W in the X direction.

Functions of the microscope device 81 having the above-mentioned configuration will be described with reference to the flowcharts illustrated in FIGS. 3 to 5. Since the microplate 13 adopted in the present embodiment has the number of wells of 12×8=96 (i=1 to 12, j=1 to 8), m is 12 and n is 8. Further, the interval (N) between the optical axis of the low-magnification objective lens 21 and the optical axis of the high-magnification objective lens 39 is 3, namely N=3.

In order to observe the spheroid S accommodated in each well W of the microplate 13 by the microscope device 81 according to the present embodiment, as illustrated in the flowchart of FIG. 3, first, the first imaging unit 83 performs preliminary reading.

More specifically, first, the controller 11 initializes the variables, namely i=1 and j=1 (Refer to step SA1). Next, the controller 11 drives the movable stage 3 so as to align the central position of each well W on the optical axis of the low-magnification objective lens 87 of the first imaging unit 83 sequentially, as illustrated in FIG. 6, from well W (i=1, j=1) to well W (i=1, j=8)→from well W (i=2, j=8) to well W (i=2, j=1)→from well W (i=3, j=1) to well W (i=3, j=8). And, the controller 11 performs the processing of steps SA2 to SA7.

When the processing of steps SA2 to SA7 completes for the well W (i=3, j=8), that is, when the setting is changed to i=3 and j=8, the condition j=n is satisfied ("YES" in step SA6). Therefore, the controller 11 determines whether the present setting is i=N (Refer to step SA8). In the present embodiment, since the interval (N) between the optical axis of the low-magnification objective lens 21 and the optical axis of the high-magnification objective lens 39 is 3, namely N=3 ("YES" in step SA8), the controller 11 terminates the preliminary reading.

Next, as illustrated in the flowchart of FIG. 4, the controller 11 increment the variable i, namely i=i+1. In this case, the controller 11 sets the variables to i=4 and j=8 (Refer to step SB1). Then, the controller 11 drives the movable stage 3 so that the well W is moved with respect to the first imaging unit 5 and the second imaging unit 7. The second imaging unit 7 repeats the processing of steps SB2 to SB8 for each well W, and the first imaging unit 5 repeats the processing of steps SA3' and SA4'.

More specifically, in one process, for the second imaging unit 85, the processing of steps SB2 to SB8 is repeated, while the central position of the spheroid S in the well W is sequentially adjusted to the optical axis of the high-magnification objective lens 39 as illustrated in FIG. 7, from well W (i=1, j=8) to well W (i=1, j=1)→from well W (i=2, j=1) to well W (i=2, j=8)→from well W (i=3, j=8) to well W (i=3, j=1)→from well W (i=4, j=1) to well W (i=4, j=8)→from well W (i=5, j=8) to well W (i=5, j=1)→from well W (i=6, j=1) to well W (i=6, j=8)→from well W (i=7, j=8) to well W (i=7, j=1)→from well W (i=8, j=1) to well W (i=8, j=8) from well W (i=9, j=8) to well W (i=9, j=1). Then, the computer 9 generates a three-dimensional XYZ image for each spheroid S.

In the other process, for the first imaging unit 83, the processing of steps SA3' and SA4' is repeated while each well W is sequentially moved on the optical axis of the low-magnification objective lens 87, as illustrated in FIG. 6, from well W (i=4, j=8) to well W (i=4, j=1)→from well W (i=5, j=1) to well W (i=5, j=8)→from well W (i=6, j=8) to well W (i=6, j=1)→from well W (i=7, j=1) to well W (i=7, j=8)→from well W (i=8, j=8) to well W (i=8, j=1)→from well W (i=9, j=1) to well W (i=9, j=8)→from well W (i=10, j=8) to well W (i=10, j=1)→from well W (i=11, j=1) to well W (i=11, j=8)→from well W (i=12, j=8) to well W (i=12, j=1).

In this case, in the above-mentioned two processes, the controller 11 synchronously performs the acquisition of imaging data by the second imaging unit 7 for the spheroid S in each well W (Refer to step SB6) and the acquisition of imaging data by the first imaging unit 5 for another spheroid S in the well W (Refer to step SA3').

When the processing of steps SA3' and SA4' completes for the well W (i=12, j=1), that is, when the setting has been changed to i=12 and j=1 ("YES" step SB9, and "YES" in step SB11), the controller 11 determines whether the present setting is i=m (Refer to step SB12). In the present embodiment, since m is 12 ("YES" in step SB12), the acquisition of imaging data by the first imaging unit 5 terminates.

Next, as illustrated in the flowchart of FIG. 5, the controller 11 increments the variable i by one, i.e., i=i+1. In this case, i=13 and j=1 are set (Refer to step SB1). Then, in the state where the acquisition of imaging data by the first imaging unit 83 has terminated, the second imaging unit 85 performs the processing of steps SB1 to SB11 for respective wells, from well W (i=10, j=1) to well W (i=10, j=8)→from well W (i=11, j=8) to well W (i=11, j=1)→from well W (i=12, j=1) to well W (i=12, j=8).

When the processing of steps SB2 to SB11 completes for the well W (i=12, j=8), that is, when the setting has been changed to i=15 and j=8, since the condition j=n is satisfied ("YES" in step SB10), the controller 11 determines whether the present setting i=m+N (Refer to step SB12"). In the present embodiment, m is 12 and N is 3 ("YES" in step SB12"), the acquisition of imaging data by the second imaging unit 7 terminates. Finally, the computer 9 generates a three-dimensional XYZ image for each spheroid S, and the imaging terminates.

As mentioned above, even in the microscope device 81 according to the present embodiment, the controller 11 causes the first imaging unit 83 to acquire imaging data of the spheroid S in another well W in synchronization with the acquisition of imaging data by the second imaging unit 85. Therefore, effects similar to those in the first embodiment can be expected. Further, in the present embodiment, the central position of each spheroid S and the spherical aberration correction value are determined while a plurality of spheroids S accommodated in each well W is associated with each well W. The determined vales are available in the acquisition of imaging data by the second imaging unit 85.

Further, in the present embodiment, the first imaging unit 83 is configured by an inverted type, and the transmission lighting device 89 capable of realizing illumination with focal illumination is added on the optical axis of the low-magnification objective lens 87. With this configuration, the first imaging unit 83 can acquire excellent imaging data higher in contrast. Further, as the second imaging unit 85 is configured by the multiphoton excitation microscope, there is an advantage that good imaging data can be acquired even for a relatively large spheroid S that is not subjected to transparency processing.

Third Embodiment

Next, a microscope device (microscope) according to a third embodiment of the present invention will be described.

Figure 9:
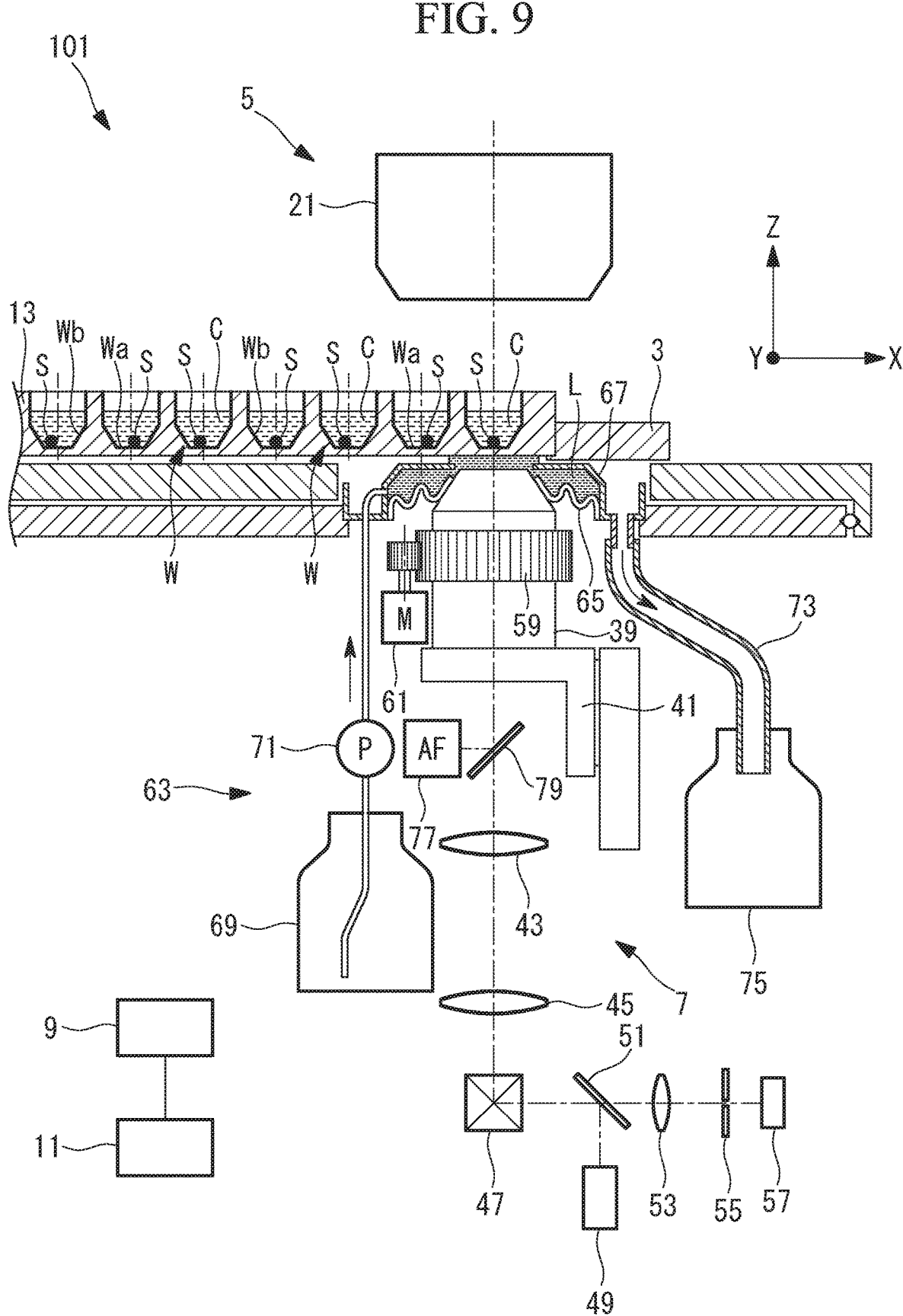
FIG. 9 is a diagram illustrating a schematic configuration of a microscope device according to a third embodiment of the present invention.

A microscope device 101 according to the present embodiment is different from the first embodiment in that, as illustrated in FIG. 9, the optical axis of the low-magnification objective lens 21 and the optical axis of the high-magnification objective lens 39 are arranged coaxially and the first imaging unit 5 has an imaging area enabling imaging of a region having a radius of at least R=(the well pitch+well diameter). In FIG. 9, although not illustrated, the microscope device 101 includes the reflection lighting device 33 and the camera 31, similar to the first embodiment.

Hereinafter, portions having configurations common to those of the microscope device 1 according to the first embodiment are denoted by the same reference numerals and not described in detail.

Figure 10:
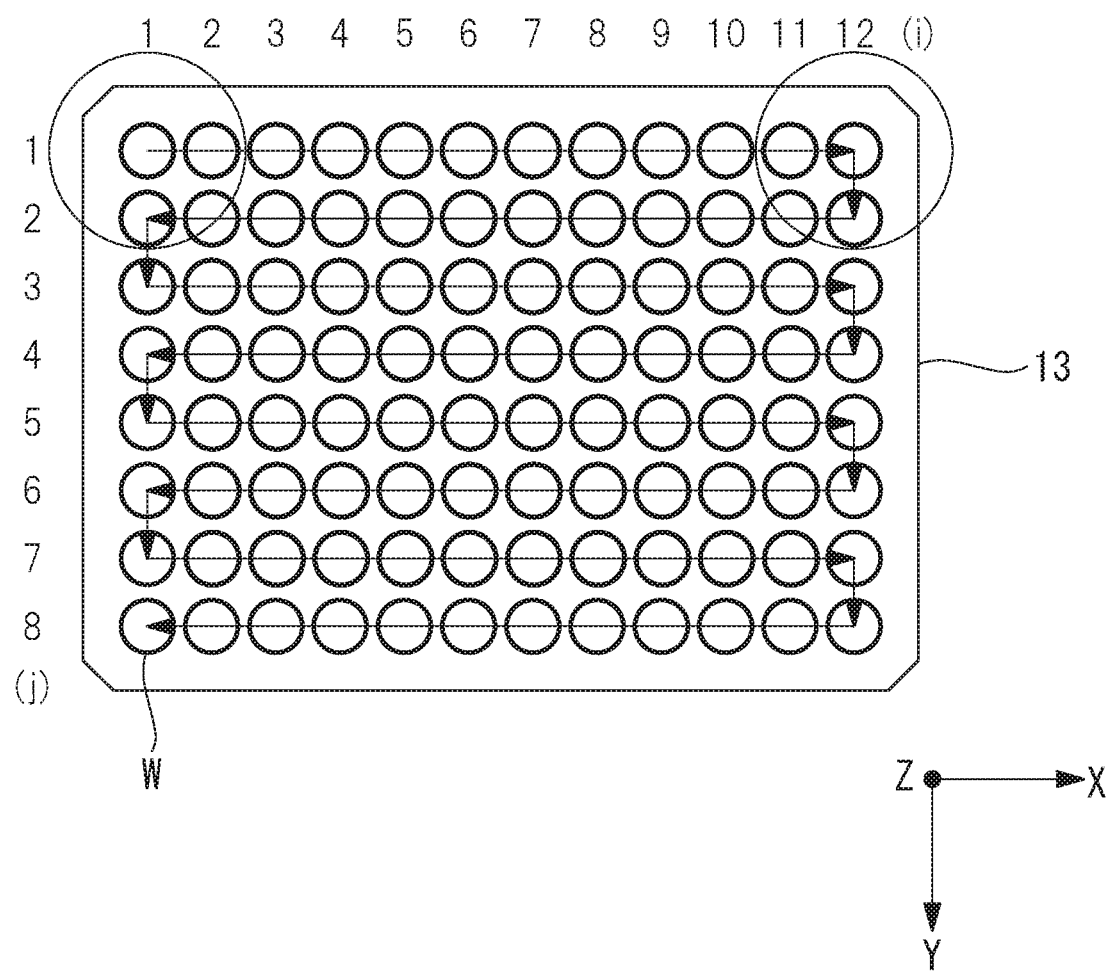
FIG. 10 is a diagram illustrating an example of the order of imaging wells by the microscope device illustrated in FIG. 9.

In the present embodiment, the controller 11 drives the movable stage 3 so that the well W is sequentially moved with respect to the first imaging unit 5 and the second imaging unit 7, as illustrated in FIG. 10, from well W (i=1, j=1) to well W (i=12, j=1)→from well W (i=12, j=2) to well W (i=1, j=2)→from well W (i=1, j=3) to well W (i=12, j=3)→from well W (i=12, j=4) to well W (i=1, j=4)→from well W (i=1, j=5) to well W (i=12, j=5)→from well W (i=12, j=6) to well W (i=1, j=6)→from well W (i=1, j=7) to well W (i=12, j=7)→from well W (i=12, j=8) to well W (i=1, j=8).

Finally, the first imaging unit 5 acquires imaging data of the spheroid S in the well W (i=1, j=1). In FIG. 10, the great circle conceptually represents the imaging area of the first imaging unit 5.

Next, the controller 11 drives the movable stage 3 based on the imaging data of the spheroid S in the well W (i=1, j=1) acquired by the first imaging unit 5 according to the central position of the spheroid S determined by the computer 9, and the central position of the spheroid S is adjusted to the optical axis of the high-magnification objective lens 39 of the second imaging unit 7.

Then, in synchronization with the acquisition of imaging data of the spheroid S in the well W (i=1, j=1) by the second imaging unit 7, the first imaging unit 5 acquires imaging data of the spheroid S in the well W (i=2, j=1).

Next, the controller 11 drives the movable stage 3 based on the imaging data of the spheroid S in the well W (i=2, j=1) acquired by the first imaging unit 5 according to the central position of the spheroid S determined by the computer 9, and the central position of the spheroid S is adjusted to the optical axis of the high-magnification objective lens 39 of the second imaging unit 7.

Then, in synchronization with the acquisition of imaging data of the spheroid S in the well W (i=2, j=1) by the second imaging unit 7, the first imaging unit 5 acquires imaging data of the spheroid S in the well W (i=3, j=1).

Similarly, following the arrow in FIG. 10, while the well W is moved with respect to the first imaging unit 5 and the second imaging unit 7, acquisition of imaging data by the second imaging unit 7 for the spheroid S in the well W whose imaging data has been previously acquired by the first imaging unit 5 and acquisition of imaging data of another spheroid S in the well W by the first imaging unit 5 are sequentially performed synchronously.

Finally, the movable stage 3 is driven based on the imaging data of the spheroid S in the well W (i=1, j=8) acquired by the first imaging unit 5 according to the central position of the spheroid S determined by the computer 9, and the central position of the spheroid S is adjusted to the optical axis of the high-magnification objective lens 39 of the second imaging unit 7.

Then, in the state where the acquisition of imaging data by the first imaging unit 5 has terminated, the second imaging unit 7 acquires imaging data of the spheroid S in the well W=1, j=8). When the computer 9 generates an XYZ image of the spheroid S, the imaging terminates.

As mentioned above, even in the microscope device according to the present embodiment, the controller 11 causes the first imaging unit 5 to acquire imaging data of the spheroid S in another well W in synchronization with the acquisition of imaging data by the second imaging unit 7. Therefore, effects similar to those in the first embodiment can be obtained. In particular, in the present embodiment, since the first imaging unit 5 and the second imaging unit 7 synchronously acquire imaging data of the spheroid S for 94 wells W out of 96 wells W, very high throughput can be achieved.

In the above-mentioned first and second embodiments, for example, when a microplate having the number of wells of 1536=1 to 48, j=1 to 32) and the well pitch of 2.25 mm is adopted as the standard, the optical axis of the low-magnification objective lens 21 and the optical axis of the high-magnification objective lens 39 may be arranged apart from each other by a distance of 4.5 mm, 9 mm, or 18 mm.

By this arrangement, any of a microplate having the number of wells of 384 (i=1 to 24, j=1 to 16) and the well pitch of 4.5 mm, the microplate 13 having the number of wells of 96 (i=1 to 12, j=1 to 8) and the well pitch of 9 mm, and a microplate having the number of wells of 24 (i=1 to 6, j=1 to 4) and the well pitch of 18 mm is adoptable.

Further, the microplate 13 exemplarily described in each of the above-mentioned embodiments has a plurality of wells W arrayed in a square shape. Alternatively, it is possible to adopt a microplate having a plurality of wells W spaced apart from each other in a circumferential direction and arrayed in a ring shape. In this case, it is desired to adopt a rotary stage for rotating the microplate and cause the movable stage 3 to move the rotary stage in the X direction and the Y direction.

For a microplate having a plurality of wells W arrayed in a single annular array, the low-magnification objective lens 21 or 87 and the high-magnification objective lens 39 may be arranged apart from each other at an interval of an integer multiple (N) of the well pitch in the circumferential direction.

For a microplate having a plurality of wells W arrayed in a plurality of annular arrays radially offset, the low-magnification objective lens 21 or 87 and the high-magnification objective lens 39 may be arranged apart from each other in the circumferential direction. Further, it is desired to provide the moving means capable of adjusting the position of the first imaging unit 5 when changing the row of wells W for acquiring imaging data.

Further, the low-magnification objective lens 21 or 87 and the high-magnification objective lens 39 may be arranged apart from each other at an interval of an integer multiple (N) of the well pitch in the radial direction. In the case of defining the well pitch by the rotation angle, it is desired to rotate the microplate by the same rotation angle, irrespective of the row of wells W, for the low-magnification objective lens 21 or 87 and the high-magnification objective lens 39. Further, in the case of defining the well pitch by the distance, it is desired to change the rotation angle of the microplate depending on the row of wells W, for the low-magnification objective lens 21 or 87 and the high-magnification objective lens 39.

Further, although the microplate exemplarily illustrated in each of the above-mentioned embodiments is the general microplate 13 having 96 wells W, the sample container is not limited to the well of the general microplate. For example, the present invention is applicable to a base material having supports arrayed so as to form a hanging drop.

Although some embodiments of the present invention have been described in detail with reference to attached drawings, the detailed configurations are not limited to the illustrated embodiments and can be modified in various ways within the scope not deviating from the gist of the present invention. For example, the present invention is not limited to application to each of the above-mentioned embodiments and modifications. The present invention encompasses any appropriate combination of these embodiments and modifications.

Further, for example, although the low-magnification objective lens 21 or 87 and the high-magnification objective lens 39 have been exemplarily illustrated in each of the above-mentioned embodiments, the present invention is not limited to the illustrated examples as long as the second imaging unit 7 has a second objective lens higher in magnification than the first objective lens of the first imaging unit 5. Further, imaging areas of the first imaging unit 5 or 83 and the second imaging unit 7 or 85 are not limited to the sizes described in each of the above-mentioned embodiments exemplarily illustrated.

Further, although the representative position of the sample has been exemplarily illustrated as the central position of the spheroid S, it may be any position of the spheroid S as long as it serves as the standard. Further, although the sample has been exemplarily illustrated as the spheroid S, it may be a biological material such as a cell, a cellular tissue, or an organoid.

From the above-described embodiment, the following invention is derived.

A first aspect of the present invention is a microscope including a movable stage that supports a plurality of sample containers arranged in an array so as to be movable in a horizontal direction, a first imaging unit having a first objective lens and configured to acquire imaging data of a sample accommodated in each of the sample containers, a second imaging unit having a second objective lens higher in magnification than the first objective lens and configured to acquire imaging data of the sample accommodated in each of the sample containers, a representative position determination unit configured to determine a representative position of the sample based on the imaging data of the sample for each of the sample containers obtained by the first imaging unit, and a control unit configured to cause the first imaging unit and the second imaging unit to sequentially acquire imaging data of the sample in each of the sample containers by causing the movable stage to move the sample containers with respect to the first imaging unit and the second imaging unit. The control unit causes the first imaging unit to acquire the imaging data for the sample in one of the sample containers, and then causes the movable stage to adjust the representative position of the sample determined by the representative position determination unit based on the imaging data acquired by the first imaging unit to an optical axis of the second objective lens, and then causes the second imaging unit to acquire the imaging data, while causing the first imaging unit to acquire the imaging data of the sample in another of the sample containers in synchronization with acquisition of the imaging data by the second imaging unit.

According to this aspect, imaging data of the sample in one of the sample containers is acquired by the first imaging unit having the first objective lens lower in magnification, prior to the second imaging unit having the second objective lens higher in magnification. Accordingly, the representative position determination unit can determine easily and surely the representative position of a sample accommodated in a sample container. Subsequently, when the representative position of the sample is determined by the representative position determination unit, imaging data can be acquired by the second imaging unit in a state where adjustment of the representative position of the sample to the optical axis of the second objective lens by the movable stage is completed. This makes it possible to suppress the second imaging unit from acquiring useless imaging data not sufficiently including the captured sample. Accordingly, it is possible to efficiently acquire high-resolution imaging data of the sample.

In this case, the control unit causes the first imaging unit to acquire imaging data of a sample in another of the sample containers in synchronization with acquisition of imaging data by the second imaging unit. Therefore, the throughput can be improved by an amount corresponding to time overlapping between acquisition of imaging data by the first imaging unit and acquisition of imaging data by the second imaging unit when they are performed, compared to a case where the first imaging unit acquires imaging data of all samples and subsequently the second imaging unit acquires imaging data for all samples. Accordingly, high-resolution imaging data of a plurality of samples can be acquired with high throughput.

In the above-mentioned aspect, the optical axis of the first objective lens and the optical axis of the second objective lens may be spaced apart from each other in the array arrangement direction by a distance comparable to an integer multiple of the pitch between the sample containers. With this configuration, the first imaging unit and the second imaging unit can synchronously acquire imaging data of samples in different sample containers separated by the distance comparable to the integer multiple of a pitch between the sample containers.

In the above-mentioned aspect, the sample containers are supported by the movable stage in a two-dimensional array of m×n (m>n), and the optical axis of the first objective lens and the optical axis of the second objective lens may be spaced apart from each other in a direction of m of the sample containers being arrayed.

With this configuration, it is possible to reduce the number of times that the acquisition of imaging data by the first imaging unit and the acquisition of imaging data by the second imaging unit are performed asynchronously. That is, according to the above-mentioned configuration, the first imaging unit acquires imaging data in advance for samples in sample containers arranged on one end side, among the m sample containers arrayed, without any synchronization with the second imaging unit. Subsequently, the second imaging unit acquires imaging data for samples in sample containers arranged on the other end side without any synchronization with the first imaging unit. Therefore, the number of sample containers for which imaging data is acquired by either one of the first imaging unit and the second imaging unit is only n. Accordingly, the time required for the acquisition of imaging data by either one of the first imaging unit and the second imaging unit can be reduced.

In the above-mentioned aspect, it may be desired to include a transmission lighting device configured to cause illumination light to penetrate the sample toward the first imaging unit along the optical axis of the first objective lens by irradiating the sample with the illumination light.

With this configuration, it is possible to observe the sample with transmitted illumination by the transmission lighting device and the first imaging unit.

In the above-mentioned aspect, it may be desired to include a reflection lighting device configured to cause illumination light to reflect on the sample toward the first imaging unit along the optical axis of the first objective lens by irradiating the sample with the illumination light.

With this configuration, it is possible to observe the sample with reflected illumination by the reflection lighting device and the first imaging unit.

In the above-mentioned aspect, it may be desired to irradiate the sample with the illumination light at an angle with respect to the optical axis of the first objective lens, thereby illuminating the sample with focal illumination.

With this configuration, excellent imaging data higher in contrast can be acquired.

In the above-mentioned aspect, the second objective lens may be arranged with the optical axis thereof directed vertically upward.

With this configuration, the second objective lens can be arranged at a position closer to the sample accommodated in the sample container. This makes it easy to acquire imaging data of a sample using the second objective lens shorter in operation distance compared to the first objective lens.

In the above-mentioned aspect, the first objective lens may be arranged with the optical axis thereof directed vertically downward.

With this configuration, the first objective lens and the second objective lens can be arranged without interfering with each other.

In the above-mentioned aspect, the optical axis of the first objective lens and the optical axis of the second objective lens may be arranged apart from each other by a distance comparable to one of the sample containers in an arrangement direction of the sample containers.

With this configuration, the first imaging unit and the second imaging unit can synchronously acquire imaging data of samples in mutually neighboring sample containers.

In the above-mentioned aspect, the optical axis of the first objective lens and the optical axis of the second objective lens may be arranged apart from each other by 4.5 mm, 9 mm, or 18 mm.

With this configuration, when adopting a general microplate having a plurality of wells, as a plurality of sample containers, arrayed at the pitch of 4.5 mm, 9 mm, or 18 mm, it is possible to cope with any microplate.

In the above-mentioned aspect, the second imaging unit may have a variable power function for changing image magnification.

With this configuration, the imaging area by the second imaging unit can be adjusted to the size of the sample by the variable power function. As a result, in the imaging data, the range in which no sample appears can be reduced.

In the above-mentioned aspect, the second imaging unit may include a scanning unit configured to scan illumination light on the sample, and the scanning unit realizes the variable power function by changing a scanning area of the illumination light.

With this configuration, the variable power function can be efficiently realized by using the scanning unit.

In the above-mentioned aspect, it may be desired to include an image magnification adjustment unit configured to acquire size information of the sample in a plane extending in the horizontal direction based on the imaging data acquired by the first imaging unit and adjust the image magnification based on the acquired size information.

With this configuration, the image magnification adjustment unit can improve the resolution on the pixel pitch determined by the imaging pixel number and the imaging area, with respect to optical resolution.

In the above-mentioned aspect, the second imaging unit may include imaging pixel number changing means for changing the number of imaging pixels.

With this configuration, the imaging pixel number changing means can appropriately set the resolution on the pixel pitch determined by the imaging pixel number and the imaging area.

In the above-mentioned aspect, a correction value determination unit configured to acquire size information of the sample in a plane extending in the horizontal direction based on the imaging data acquired by the first imaging unit and determine a spherical aberration correction value based on the acquired size information, and a spherical aberration correction unit configured to correct spherical aberration of the second objective lens according to the spherical aberration correction value determined by the correction value determination unit may be included.

With this configuration, the quality of the imaging data acquired by the second imaging unit can be improved.

In the above-mentioned aspect, when the second imaging unit acquires three-dimensional imaging data of the sample, the correction value determination unit may correct the spherical aberration correction value according to the position of the sample in a vertical direction.

With this configuration, it is possible to acquire good quality three-dimensional imaging data of the sample with spherical aberration corrected.

REFERENCE SIGNS LIST 1, 81, 101 microscope device (microscope)
3 movable stage
5, 83 first imaging unit
7, 85 second imaging unit
9 computer (representative position determination unit, correction value determination unit, and image magnification adjustment unit)
11 controller (control unit and image magnification adjustment unit)
21, 87 low-magnification objective lens (first objective lens)
33 reflection lighting device
39 high-magnification objective lens (second objective lens)
47 XY galvanometer mirror scanner (the scanning unit and image magnification adjustment unit)
57 photodetector (imaging pixel number changing means)
59 correction ring (spherical aberration correction unit)
89 transmission lighting device
S spheroid (sample)

The invention claimed is:

1. A microscope comprising:
a movable stage that supports a plurality of sample containers arranged in an array so as to be movable in a horizontal direction;
a first objective lens;
a second objective lens higher in magnification than the first objective lens, an optical axis of the second objective lens being spaced apart from an optical axis of the first objective lens in an array arrangement direction by a distance substantially equal to an integer multiple of a pitch between two adjacent ones of the sample containers;
a first imaging device that acquires, by using the first objective lens, first imaging data of a sample accommodated in each of the sample containers;
a second imaging device that acquires, by using the second objective lens, second imaging data of the sample accommodated in each of the sample containers, the second imaging device being provided separately from the first imaging device;
a computer configured to determine, for each of the sample containers, a representative position of the sample based on the first imaging data of the sample obtained by the first imaging device; and a controller that controls the first imaging device and the second imaging device to acquire the first and second imaging data of the sample in each of the sample containers by controlling the movable stage to move the sample containers with respect to the first imaging device and the second imaging device, wherein the controller (i) controls the first imaging device to acquire the first imaging data for a first sample in one of the sample containers, (ii) then controls the movable stage to move so as to align the representative position of the first sample determined by the computer based on the first imaging data acquired by the first imaging device with the optical axis of the second objective lens, and (iii) then controls the second imaging device to acquire the second imaging data for the first sample in the one of the sample containers while controlling the first imaging device to acquire the first imaging data of the sample in another of the sample containers in synchronization with the acquisition of the second imaging data for the first sample in the one of the sample containers by the second imaging device.

2. The microscope according to claim 1, wherein the sample containers are supported by the movable stage in a two-dimensional array of m×n (m>n), and the optical axis of the first objective lens and the optical axis of the second objective lens are spaced apart from each other in a direction of m of the sample containers being arrayed.

3. The microscope according to claim 1, further comprising an irradiator that causes illumination light to penetrate the sample toward the first camera along the optical axis of the first objective lens by irradiating the sample with the illumination light.

4. The microscope according to claim 1, further comprising an irradiator that causes illumination light to reflect on the sample toward the first camera along the optical axis of the first objective lens by irradiating the sample with the illumination light.

5. The microscope according to claim 3, wherein the sample is irradiated with the illumination light at an angle with respect to the optical axis of the first objective lens, thereby illuminating the sample with focal illumination.

6. The microscope according to claim 1, wherein the second objective lens is arranged with the optical axis thereof directed vertically upward.

7. The microscope according to claim 6, wherein the first objective lens is arranged with an optical axis thereof directed vertically downward.

8. The microscope according to claim 1, wherein the optical axis of the first objective lens and the optical axis of the second objective lens are arranged apart from each other by 4.5 mm, 9 mm, or 18 mm.

9. The microscope according to claim 1, further comprising a scanner that scans illumination light on the sample, wherein the scanner changes an image magnification by changing a scanning area of the illumination light.

10. The microscope according to claim 1, wherein:

the computer is configured to acquire size information of the sample in a plane extending in the horizontal direction based on the first imaging data acquired by the first imaging device, and the controller adjusts an image magnification based on the size information acquired by the computer.

11. The microscope according to claim 1, further comprising a photodetector that changes a number of imaging pixels.

12. The microscope according to claim 1, wherein:

the computer is configured to (i) acquire size information of the sample in a plane extending in the horizontal direction based on the first imaging data acquired by the first imaging device, and (ii) determine a spherical aberration correction value based on the acquired size information, and the microscope further comprises a correction ring that corrects spherical aberration of the second objective lens according to the spherical aberration correction value determined by the computer.

13. The microscope according to claim 12, wherein the computer is configured to (i) generate three-dimensional imaging data of the sample based on the second imaging data, and (ii) correct the spherical aberration correction value according to a position of the sample in a vertical direction.

14. The microscope according to claim 1, wherein the second objective lens comprises an immersion objective lens.

15. The microscope according to claim 1, wherein the first objective lens and the second objective lens are disposed on respective opposite sides of the sample containers arranged in the array.

16. The microscope according to claim 1, wherein the another of the sample containers is a sample container from among the sample containers which is adjacent to the one of the sample containers.

17. The microscope according to claim 1, wherein the sample is one of a spheroid, a cell, a cellular tissue, and an organoid.

18. The microscope according to claim 17, wherein the representative position is a central position of the sample.

19. A non-transitory computer-readable storage medium having a program for controlling a microscope stored thereon, the microscope comprising a movable stage that supports a plurality of sample containers arranged in an array so as to be movable in a horizontal direction, a first objective lens, a second objective lens, a first imaging device, and a second imaging device provided separately from the first imaging device, and the program being executable by a processor of the microscope to control the microscope to perform processes comprising:

acquiring, by the first imaging device using the first objective lens, first imaging data of a sample accommodated in each of the sample containers;

acquiring, by the second imaging device using the second objective lens, second imaging data of the sample accommodated in each of the sample containers, the second objective lens being higher in magnification than the first objective lens, and an optical axis of the second objective lens being spaced apart from an optical axis of the first objective lens in an array arrangement direction by a distance substantially equal to an integer multiple of a pitch between two adjacent ones of the sample containers;

determining, for each of the sample containers, a representative position of the sample based on the first imaging data of the sample acquired by the first imaging device; and controlling the first imaging device and the second imaging device to acquire the first and second imaging data of the sample in each of the sample containers by controlling the movable stage to move the sample containers with respect to the first imaging device and the second imaging device, wherein the controlling comprises (i) controlling the first imaging device to acquire the first imaging data for a first sample in one of the sample containers, (ii) then controlling the movable stage to move so as to align the representative position of the first sample determined in the determining based on the first imaging data acquired by the first imaging device with the optical axis of the second objective lens, and (iii) then controlling the second imaging device to acquire the second imaging data for the first sample in the one of the sample containers while controlling the first imaging device to acquire the first imaging data of the sample in another of the sample containers in synchronization with the acquisition of the second imaging data for the first sample in the one of the sample containers by the second imaging device.

* * * * *